United States Patent [19]

Ishida

[11] Patent Number: 4,709,672
[45] Date of Patent: Dec. 1, 1987

[54] COMBUSTION CHAMBER FOR AN INTERNAL-COMBUSTION ENGINE

[75] Inventor: Shiro Ishida, Fujisawa, Japan

[73] Assignee: Isuzu Motors Limited, Tokyo, Japan

[21] Appl. No.: 864,673

[22] Filed: May 19, 1986

[30] Foreign Application Priority Data

| May 21, 1985 | [JP] | Japan | 60-106944 |
| Nov. 29, 1985 | [JP] | Japan | 60-267401 |
| Dec. 13, 1985 | [JP] | Japan | 60-278879 |

[51] Int. Cl.⁴ .................................... F02B 23/08
[52] U.S. Cl. .................................... 123/256; 123/260; 123/276
[58] Field of Search ............ 123/276, 279, 256, 260, 123/261

[56] References Cited

U.S. PATENT DOCUMENTS

| 2,881,743 | 4/1959 | Holt | 123/276 |
| 3,125,079 | 3/1964 | Hoffmann | 123/279 |
| 3,144,008 | 8/1964 | List | 123/276 |
| 3,504,681 | 4/1970 | Winkler | 123/276 |

FOREIGN PATENT DOCUMENTS

| 595387 | 3/1960 | Canada | 123/256 |
| 57-41417 | 3/1982 | Japan | 123/276 |
| 58-48710 | 3/1983 | Japan | 123/276 |
| 59-221419 | 12/1984 | Japan | 123/261 |

Primary Examiner—Andrew M. Dolinar
Attorney, Agent, or Firm—Cullen, Sloman, Cantor, Grauer, Scott & Rutherford

[57] ABSTRACT

A combustion chamber for an internal-combustion engine of the direct fuel injection type using a volatile fuel having a low cetane number, such as alcohol. The combustion chamber comprises a main combustion chamber and an auxiliary combustion chamber which are formed in the crown of a piston so as to overlap each other and so that individual swirls of intake air are formed therein, respectively. The fuel highly atomized for quick evaporation is supplied to the auxiliary combustion chamber and fuel films are formed over the respective inner surfaces of the main and auxiliary combustion chambers for being vaporized by the heat of the walls of the main and auxiliary combustion chambers. Thus, the combustion chamber has excellent combustion characteristics, in which the air-fuel mixture is reliably ignited in the entire range of loaded operation of the engine, combustion noise and vibration are reduced, and the discharge of unburned substances is controlled.

35 Claims, 26 Drawing Figures

COMBUSTION CHAMBER FOR AN INTERNAL-COMBUSTION ENGINE

BACKGROUND OF THE INVENTION

1. Field of the Invention

The present invention relates to the combustion chamber of a direct-injection internal-combustion engine in which fuel is injected directly into the combustion chambers and, more specifically, to a combustion chamber for an internal-combustion engine, capable of combusting a volatile fuel having a low cetane number, such as light oil, gasoline and alcohol, over the entire range of loaded operation of the internal-combustion engine including the starting period, and capable of reducing the discharge of hydeocarbons (HCs), nitrogen oxides (NOx), incompletely combusted fuel and smoke, combustion noise and vibration of the internal-combustion engine without reducing the output of the internal-combustion engine and deteriorating the fuel consumption rate.

2. Description of the Prior Art

Generally, the diesel engine, in which fuel is injected directly into the combustion chamber for spontaneous ingition, has advantages that the engine operates at high thermal efficiency and the temperature of the exhaust gas is low. On the other hand, the diesel engine still has the drawback that the delay in ignition timing enhances the internal pressure of the cylinder, combustion noise and vibration.

The MAN-M engine has been developed to eliminate such drawbacks of the conventional diesel engine. In the MAN-M engine, fuel is caused to impinge on the inner surface of a spherical combustion chamber defined by the cylinder head and a piston having a concave top surface by producing a swirl of fuel in the combustion chamber so that the vapor of the fuel and air are mixed well to produce an inflammable premixture, which generally enables slow combustion.

However, since the MAN-M engine makes the fuel injected into the cylinder evaporate for combustion, the cylinder wall is not sufficiently capable of evaporating the fuel when the temperature of the atmosphere and the cooling water is low. When the fuel is not satisfactorily evaporated, much unburned substances such as HCs and white smoke are produced in the combustion chamber. The cylinder wall is not heated to a temperature high enough to evaporate the fuel during low-load operation of the engine, such as idling, even when the temperature of the atmosphere and the cooling water is relatively high, and thereby much unburned substances (HCs) are produced to deteriorate the combustion.

Such a drawback is found also in a troidal combustion chamber in which a lean mixture is combusted. Such an unsatisfactory combustion occurs in a troidal combustion chamber because the flame is unable to propagate normally after ignition and is blown out.

In order to eliminate such drawbacks, combustion chambers A, B and C have been proposed in Japanese provisional patent Publication No. 49-50307, Japanese Provisional Utility Model Publication No. 57-33221 and Japanese Provisional Patent Publication No. 57-41417, respectively. These prior art combustion chambers will be described hereunder.

As illustrated in FIG. 23 of Japanese Provisional Patent Publications No. 49-50307, the combustion chamber A is of the MAN-M fashion having a main combustion chamber 50 defined by the cylinder head and a deep recess formed in the crown 2a of a piston, a small substantially spherical precombustion chamber 52 formed in the cylinder head 51, and a connecting passage 53 formed in the cylinder head 51 so as to interconnect the main combustion chamber 50 and the precombustion chamber 52.

As illustrated in FIG. 24 of Japanese Provisional Utility Model Publication No. 57-33221, the combustion chamber B, similar to the combustion chamber A, has a main combustion chamber 50a formed in the crown of a piston 1b and a precombustion chamber 52b formed in the cylinder head 51a. A connecting passage 53a is formed so as to interconnect the main combustion chamber 50a and the precombustion chamber 52b tangentially and to form a swirl chamber 54 when the piston 1b is at the top dead point.

In the combustion chambers A and B, fuel is injected into the precombustion chamber 52 during the low-load operation of the engine and to inject fuel into the main combustion chamber 50 during the high-load operation of the engine and, during the low-load operation of the engine in particular, the air fuel ratio (air/fuel) is reduced to suppress the production of unburned substances (HCs).

However, since the combustion chambers A and B are formed so that fuel in injected into the main combustion chamber 50 through the connecting passage 53 during the high-load operation of the engine, the injected fuel is ignited by the combustion gas prevailing within the precombustion chamber 52 before being injected into the main combustion chamber 50, and hence the spray of the injected fuel is unable to reach the main combustion chamber 50. Consequently, incomplete combustion of the fuel results in the main combustion chamber producing smoke and causing the reduction of combustion efficiency.

The combustion chamber C as illustrated in FIG. 25 of Japanese Provision Patent Publication No. 57-41417 has been proposed to eliminate the drawbacks of the combustion chambers A and B. According to this prior art chamber, a cavity 55 for receiving swirling intake air S is formed at least in either a piston 1c or a cylinder head 51b, an auxiliary swirl chamber 57 communicating with the cavity 55 by means of a swirl producing restrictive orifice 56 is formed in the crown of the piston 1c, and a fuel injection nozzle 58 is disposed so as to spray a part of the injected fuel on the inner surface 55a of the cavity 55 and to inject the rest throught the restrictive orifice into the auxiliary swirl chamber 57, so that the fuel is subjected to rapid combustion in the auxiliary swirl chamber 57 and to evaporation and slow combustion in the cavity 55. The restrictive orifice 56 opens into the cavity 55 along the swirling direction of the swirling intake air S. Thus, the combustion chamber of an internal-combustion engine has an auxiliary restrictive orifice opening in the direction of fuel injection and a main restrictive orifice opening into the cavity 55 in the swirling direction of the swirling intake air S. Part of the combustion chamber C is formed by the auxiliary swirl chamber in which a swirl is produced during the compression stroke of the piston and a portion of the injected fuel is combusted rapidly in the auxiliary swirl chamber, while the rest of the fuel is sprayed on the inner surface 55a of the cavity 55. A combustion gas produced by the rapid combustion of the fuel in the auxiliary swirl chamber 57 spouts from the auxiliary swirl chamber 57 into the cavity 55 to produce a strong turbulent flow of air in the cavity 55, so that the fuel adhering to inner surface 55a of the cavity 55 is spread in thin films to promote the evaporation of the fuel for slow combustion.

This combustion chamber C, however, has a problem that the fuel is evaporated excessively by the rapid flow of the combustion gas produced in the auxiliary swirl chamber 57 and by the heat of the combustion gas. This excessive evaporation of the fuel tends to be enhanced in the high-load operation of the engine. The promotion of the evaporation of the fuel in the cavity 55 produces a great amount of very inflammable premixture. When this premixture is ignited in the cavity 55 by the combustion gas, rapid combustion occurs in the cavity 55, which causes the internal pressure of the combustion chamber to rise sharply, and thereby noise increases abnormally.

A laminar fuel feed engine capable of using low-grade fuel, such as methanol (methyl alcohol), is disclosed in Japanese Provisional Utility Model Publication 57-107820. As shown in FIG. 26 of this publication, in this engine, a precombustion chamber 61 is formed on one side of the upper end of a cylinder 60, a preheating plug 63 is disposed transversely in the bottom wall 62 of the precombustion chamber 61, a fuel injection nozzle 64 is disposed opposite to the preheating plug 63, and an ignition plug 65 is disposed between the preheating plug 63 and the fuel injection nozzle 64.

This proposal is intended to ignite the fuel in a high-temperature atmosphere by heating the precombustion chamber with the preheating plug so that the low-load operation characteristics at the start of the engine is improved.

However, since the precombustion chamber 61 and the main combustion chamber 67 are interconnected by a throat 66, the forced flow of compressed air into the precombustion chamber 61 and the flow of the combustion gas from the precombustion chamber 61 into the main combustion chamber 67 inevitably entail a large loss due to the restrictive action of the throat, and thereby the thermal efficiency of the engine is reduced. Since the reduction of the thermal efficiency entails the reduction of the combustion temperature, reduction in the output of the engine and increase in unburned substances such as HCs are possible. Furthermore, in starting the engine at a very lowe atmospheric temperature, such as a temperature below −20° C., since the fuel injection rate is increased and a fuel oil having a low heat of vaporization, such as methanol, is used, it is difficult to vaporize the fuel oil. Accordingly, a long preheating time is required or increase in the heating capacity of the preheating plug is necessary, which is undesirable from the view point of the capacity of the battery and time required for starting the engine.

SUMMARY OF THE INVENTION

Accordingly, it is an object of the present invention to provide a combustion chamber for an internal-combustion engine, capable of:

(1) combusting a volatile fuel oil having a low cetane number, such as light oil, gasoline, alcohol or the like, over the entire range of loaded operation of the internal combustion engine including starting operation;

(2) suppressing the discharge of unburned substances, combustion noise and vibration; and (3) combustion characteristics particularly in respect of output and fuel consumption, equal to or superior to those of gasoline engines.

In order to achieve the object of the invention, the present invention provides a combustion chamber for an internal-combustion engine, comprising: a main combustion chamber formed by recessing the crown of a piston; an auxiliary combustion chamber formed beside the main combustion chamber by recessing the crown of the piston; and fuel injecting means having a main nozzle hole for spouting fuel into the main combustion chamber along the direction of a swirl produced in the main combustion chamber, and an auxiliary nozzle hole for spounting fuel into the auxiliary combustion chamber in the direction of a swirl produced in the auxiliary combustion chamber when the main nozzle hole is closed. Thus, the present invention is intended to enable the vaporization and combustion of a volatile fuel having low cetane number, such as light oil, and to suppress the production of unburned substances, combustion noise and vibration, by producing a premixture and fuel films in the main and auxiliary combustion chambers.

The above and other objects, features and advantages of the present invention will become more apparent from the following description taken in conjunction with the accompanying drawings.

DESCRIPTION OF THE PREFERRED EMBODIMENTS

[First Embodiment]

Figure 1:
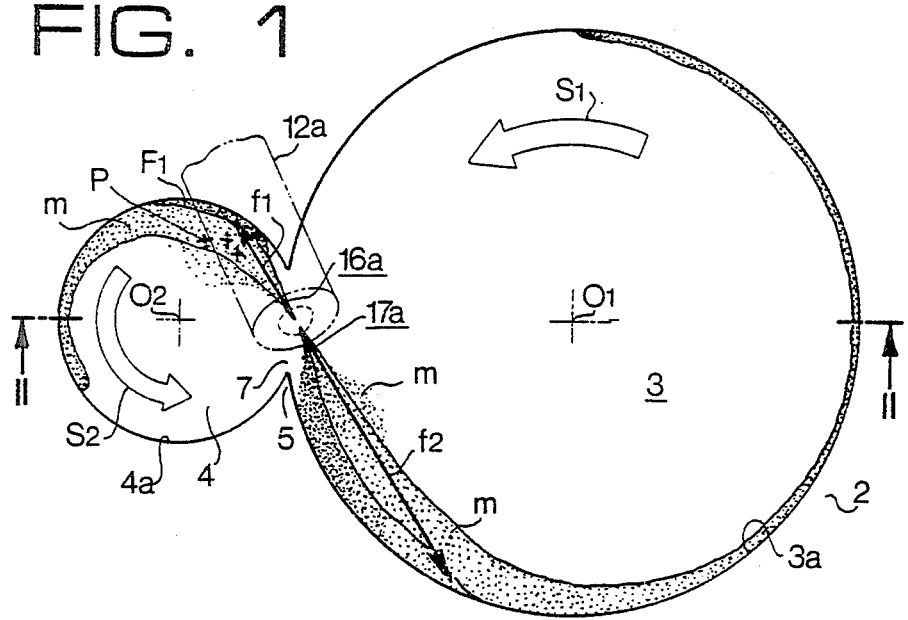
FIG. 1 is a schematic plan view of a combustion chamber, in a first embodiment, according to the present invention.
Figure 2:
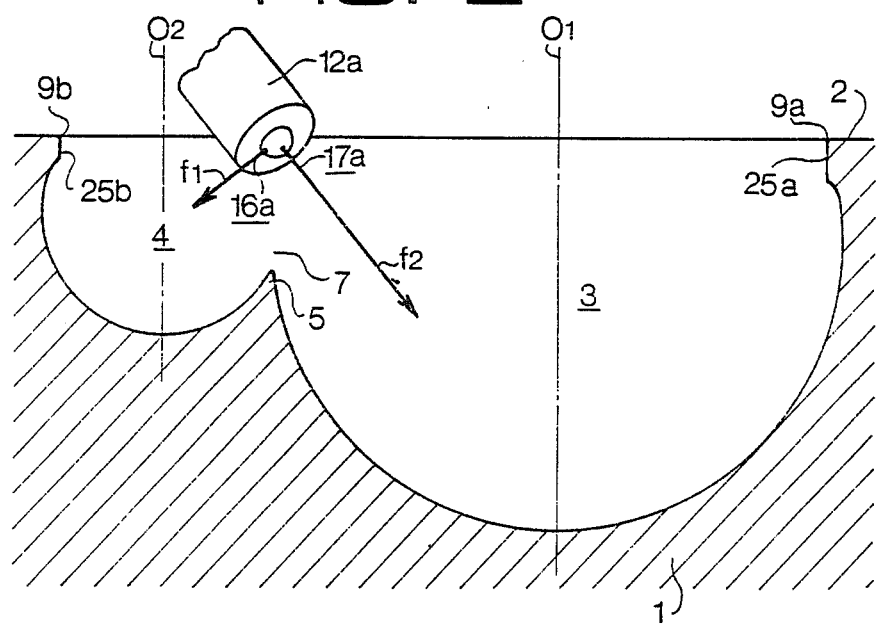
FIG. 2 is a sectional view taken on line II—II in FIG. 1 as viewed in the direction of an arrow.
Figure 3:
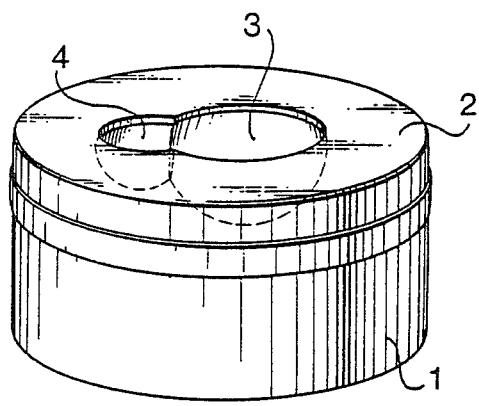
FIG. 3 is a perspective view of a piston.

In FIGS. 1 to 3, indicated at 1 is a piston slidably fitted in the cylinder, not shown, of an internal-combustion engine for reciprocation therein, at 2 is the crown of the piston 1, at 3 is a main combustion chamber, and at 4 is an auxiliary combustion chamber.

The main combustion chamber 3 is formed in a spherical surface in the central portion of the crown 2 of the piston 1. The auxiliary combustion chamber is formed also in a spherical surface and contiguously to the main combustion chamber 3 in the crown 2 of the piston 1. In this embodiment, the main combustion chamber 3 and the auxiliary combustion chamber 4 each has the shape of an arc of a circle and a circle in vertical section in a vertical plane containing the center axis of the piston 1 and in horizontal section in a horizontal plane parallel to the top surface of the crown 2 of the piston 1, respectively.

The depth and volume of the main combustion chamber 3 are greater than those of the auxiliary combustion chamber 4, respectively. The main combustion chamber 3 and the auxiliary combustion chamber 4 communicate with each other by means of a connecting passage 7 defined by a bank 5, namely, the common circumferential wall of the main combustion chamber 3 and the auxiliary combustion chamber 4.

As illustrated in FIG. 2, the connecting passage 7 is formed by locating the center axis $0_2$ of the auxiliary combustion chamber 4 relative to the center axis $0_1$ of the main combustion chamber 3 so that the respective circumferential walls of the main combustion chamber 3 and the auxiliary combustion chamber 4 overlap each other properly. That is, the overlap between the main combustion chamber 3 and the auxiliary combustion chamber 4, hence the size of the connecting passage 7 formed over the bank 5, varies according to the distance between the center axes $0_1$ and $0_2$.

Thus, the open main combustion chamber 3 and the open auxiliary combustion chamber 4 are formed contiguously in the crown 2 of the piston 1. The respective brims 9a and 9b of the main combustion chamber 3 and the auxiliary combustion chamber 4 are suitably extended radially inward to form lips 25a and 25b, respectively, for producing swirls $S_1$ and $S_2$ and squishes in the main combustion chamber 3 and the auxiliary combustion chamber 4, respectively.

Figure 4:
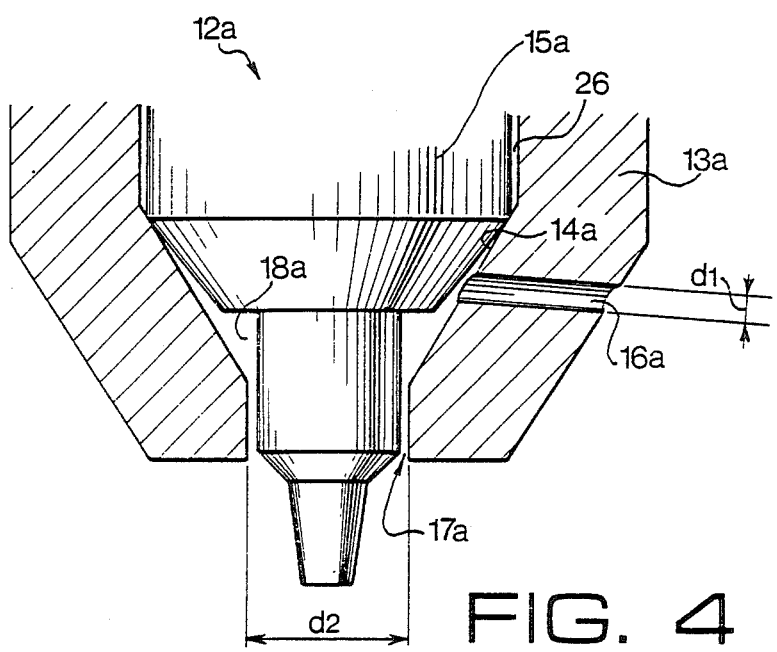
FIGS. 4 and 5 are fragmentary sectional views of injection nozzles, respectively.
Figure 5:
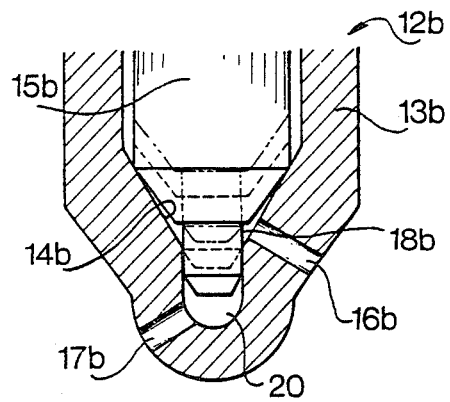
Figure 6:
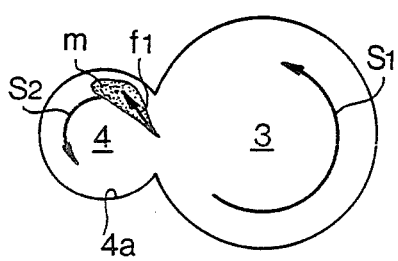
FIGS. 6 to 9 are schematic plan views of assistance in explaining fuel injection process and combustion process.

FIGS. 4 and 5 illustrate fuel injection nozzles to be used in combination with the combustion chambers of the present invention.

A first fuel injection nozzle 12a comprises, as principal elements, a cylindrical nozzle body 13a fixed to the cylinder head, not shown, and having a valve seat 14a formed inside the tip thereof, a main nozzle hole 17a formed in the tip thereof, an auxiliary nozzle hole 16a opening in the valve seat 14a, and a fuel chamber, not shown, formed by radially expanding upper internal space 26 thereof; and a needle valve element 15a having a throttle surface 18a to be seated on the valve seat 14a to close the nozzle holes 16a and 17a, and disposed vertically movably within the nozzle body 13a. The main nozzle hole 17a is opened when the lift of the needle valve element 15a exceeds a predetermined lift for opening only the auxiliary nozzle hole 16a. A fuel pressure according to the fuel supply pressure of a fuel injection pump, not shown, is applied to the upper throttle surface, not shown, of the needle valve element 15a in the fuel chamber to regulate the lift of the needle valve element 15a. The diameter $d_1$ of the auxiliary nozzle hole 16a is far smaller than the diameter $d_2$ of the main nozzle hole 17a. The main nozzle hole 17a is formed so as to spout the fuel in a highly penetrative and dispersive spray, while the auxiliary nozzle hole 16a is formed so as to spout the fuel reliably in a predetermined direction in a moderately penetrative well atomized spray to enhance the vaporization of the fuel.

A second fuel injection nozzle 12b is shown in FIG. 5. Basically, the second fuel injection nozzle 12b is the same in construction as the first fuel injection nozzle 12a.

As illustrated in FIG. 5, the second fuel injection nozzle 12b comprises, as principal elements, a nozzle body 13b and a needle valve element 15b. A taper valve seat 14b is formed inside the extremity of the nozzle body 13b so as to receive the throttle surface 18b of the needle valve element 15b thereon. A fuel injection chamber 20 is formed adjacent to the valve seat 14b so as to communicate with a fuel chamber, not shown, when the needle valve element 15b is lifted. An auxiliary nozzle hole 16b opens in the valve seat 14b, while a main nozzle hole 17b opens into the fuel injection chamber 20.

Thus, in the first fuel injection nozzle 12a and the second fuel injection nozzle 12b, only the auxiliary nozzle holes 16a and 16b are opened when the lift of the needle valve elements 15a and 15b is below a predetermined value, and both the auxiliary nozzle holes 16a and 16b and the main nozzle holes 17a and 17b are opened when the lift of the needle valve elements 15a and 15b exceeds the predetermined value. That is, the first and second fuel injection nozzles 12a and 12b are so-called Pintaux nozzles, in which the auxiliary nozzle hole is opened before the main nozzle hole.

The first embodiment will be described as employing the first fuel injection nozzle 12a.

As illustrated in FIGS. 1 and 2, the fuel injection nozzle 12a is fixed to the cylinder head, not shown, so that the auxiliary nozzle hole 16a and the main nozzle hole 17a are directed toward the auxiliary combustion chamber 4 and the main combustion chamber 3, respectively, and so that the fuel is spouted in the swirling directions of the swirls $S_2$ and $S_1$ against the inner surfaces 4a and 3a of the auxiliary combustion chamber 4 and the main combustion chamber 3, respectively.

The operation of the first embodiment will now be described with reference to the relevant drawings.

Referring to FIG. 1, air is supplied into the engine through a swirl port, not shown, so as to produce the individual swirls $S_1$ and $S_2$ of air along the inner surfaces 3a and 4a of the main combustion chamber 3 and the auxiliary combustion chamber 4, respectively. In the range of low load operation including operating conditions at the start and during the idling of the internal-combustion engine, since the lift of the needle valve element 15a (FIG. 4) is smaller than the predetermined value, only the auxiliary nozzle hole 16a is opened. Accordingly, an atomized fuel spray $f_1$ is sprayed through the auxiliary nozzle hole 16a toward the inner surface 4a of the auxiliary combustion chamber 4. Upon the impingement of the atomized fuel spray $f_1$ on the inner surface 4a of the auxiliary combustion chamber 4, a portion of the atomized fuel is further atomized and is caused to scatter, and then the further atomized fuel is vaporized instantly by the heat produced by the compression of the air. Thus, the vaporized fuel is mixed with the air to produce a highly ignitable premixture m. The rest of the atomized fuel spray $f_1$ adheres to and is caused to spread downstream by the swirl $S_2$ over the inner surface 4a of the auxiliary combustion chamber to form a fuel film $F_1$. The fuel film $F_1$ is vaporized gradually from the outer surface toward the interior thereof by the high temperature heat of the air and the heat of the wall. The fuel vapor thus produced mixes with the air in the auxiliary combustion chamber 4 to produce the premixture m as shown in FIG. 1.

Figure 7:
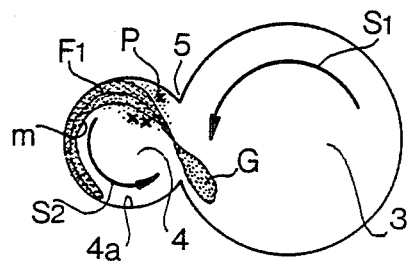

At the start of the engine where the crankshaft is driven by the starting motor or during the idling of the engine where the crankshaft is rotated at a very low speed, the rate of fuel injection through the auxiliary nozzle hole 16a is increased. Consequently, even if the fuel oil is a volatile fuel oil having a low cetane number, such as gasoline or alcohol, the air-fuel ratio of the mixture in the auxiliary combustion chamber 4 is reduced to provide a rich mixture. Accordingly, numerous flame nuclei P are formed instantly and reliably within the auxiliary combustion chamber 4 and the heat of the flame nuclei P vaporizes the fuel film $F_1$ extending over the inner surface 4a gradually to produce the premixture m that flows along the swirling direction as shown in FIGS. 1 and 7. The flame of the flame nuclei P propagates in the premixture m thus produced to ignite the same.

In this embodiment, since comparatively rapid combustion occurs in the auxiliary combustion chamber 4, the average combustion temperature in the auxiliary combustion chamber 4 rises, and thereby the discharge of HCs and the generation of smoke and white smoke are suppressed. The most part of the combustion gas G is confined within the auxiliary combustion chamber 4 by the agency of the bank 5 as shown in FIG. 7, the combustion gas G accelerates the evaporation of the fuel film $F_1$ and the production of the premixture m.

In middle- and high-load operating range in which the lift of the needle valve element 15a exceeds the predetermined value, both the auxiliary nozzle hole 16a and the main nozzle hole 17a are opened.

Figure 8:
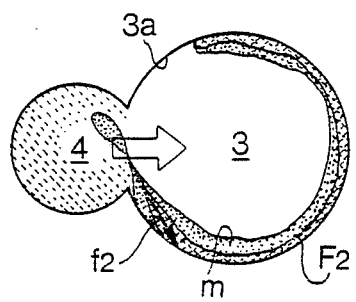
Figure 9:
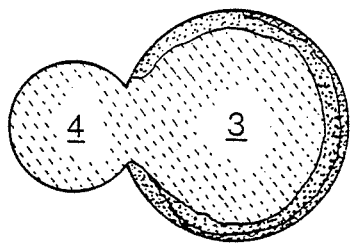

As shown in FIGS. 1 and 8, a fuel spray $f_2$ spouted through the main nozzle hole 16a is more far-reaching and more diffusive than the atomized fuel spray $f_1$ spouted through the auxiliary nozzle hole 16a. A portion of the fuel spray $f_2$ impinge against the inner surface 3a of the main combustion chamber 3 and is atomized, while the rest adheres to the inner surface 3a of the main combustion chamber 3 in a film. The film of fuel is expanded downstream along the swirling direction to form a fuel film $F_2$. The atomized portion of the fuel spray $f_2$ is vaporized in an instant by the heat produced by the compression of the intake air and the thermal energy of the flame produced in the auxiliary combustion chamber 4, and then the vaporized fuel mixes with the air to produce a premixture m. The fuel film $F_2$ also is vaporized gradually by the heat of compressed air and the heat of the wall from the outer surface thereof inward to produce the premixture m. Since the diameter of the fuel droplets of the fuel spray $f_2$ is comparatively large, excessive premixture m is not produced in the main combustion chamber 3. Accordingly, comparatively slow vaporizing combustion occurs in the main combustion chamber 3 as shown in FIG. 9. The premixture m prevailing within the main combustion chamber 3 is ignited by the combustion gas produced in the auxiliary combustion chamber 4. The proportion of the amount of fuel spouted through the main nozzle hole 17a to the total amount of fuel spouted from the fuel injection nozzle increases as the engine load increases and becomes 90% or above at the most, slow vaporizing combustion is surely maintained. Accordingly, ignition lag which causes sharp rise in the internal pressure of the cylinder and the peak temperature in the cylinder is prevented, and thereby combustion noise, vibration and the production of NOx are suppressed.

Figure 10:
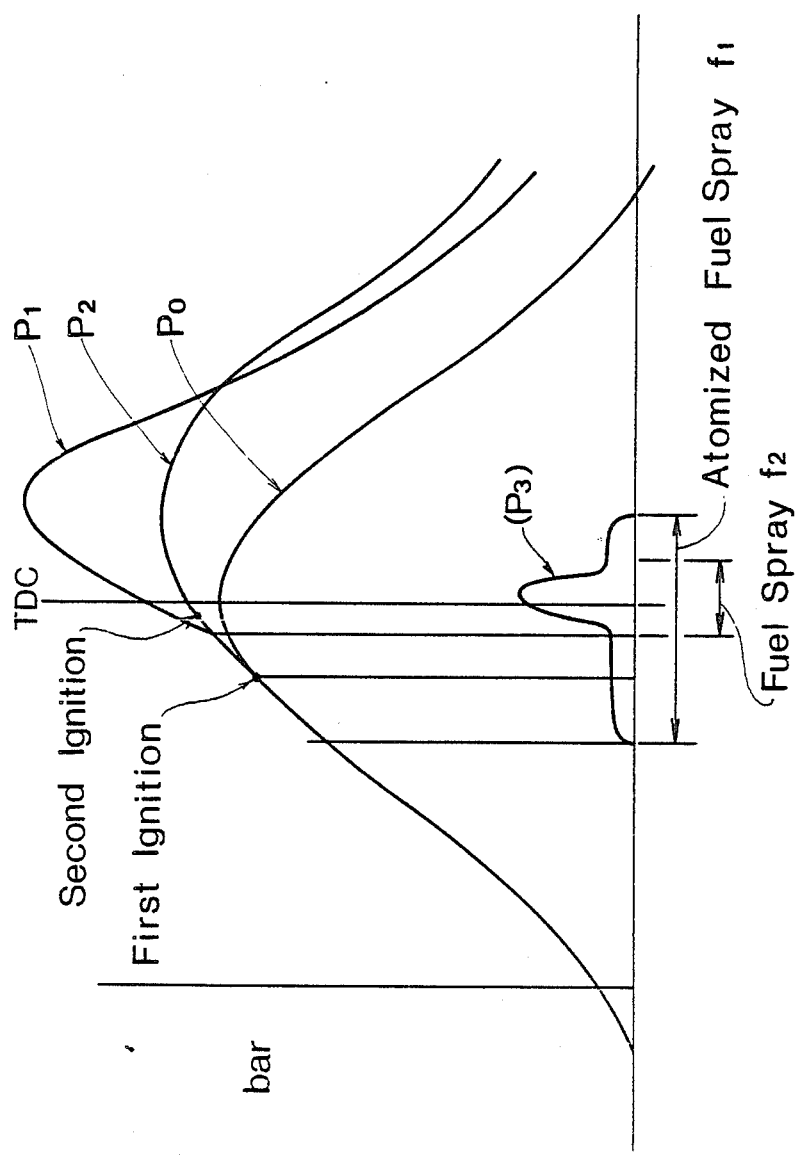
FIG. 10 is a graph comparatively showing the combustion characteristics of an internal-combustion engine having a combustion chamber according to the present invention and those of the MAN-M engine.

The characteristics of an internal-combustion engine employing the first embodiment of the present invention and a conventional MAN-M engine are shown comparatively in FIG. 10. In FIG. 10, the horizontal axis and the vertical axis indicate the crank angle (degree) and the internal pressure (bar) of the cylinder, respectively. As is apparent from FIG. 10, the characteristic curve $P_2$ for the internal-combustion engine enploying the first embodiment is similar to the characteristic curve $P_0$ for the same during motoring (operation by a motor without fuel supply). As is apparent from the characteristic curve $P_1$ for the MAN-M engine, the internal pressure rises sharply upon ignition, whereas the internal pressure of the internal-combustion engine employing the first embodiment rises moderately. In FIG. 10, a curve $P_3$ shows the variation of the amount of fuel injected with crank angle. It is seen from the curves $P_2$ and $P_3$ that the auxiliary nozzle hole 16a is opened first, then the atomized fuel spray $f_1$ is ignited, then the main nozzle hole 17a is opened to spout the fuel spray $f_2$, and then the flame of the ignited atomized fuel spray $f_1$ propagate to the fuel spray $f_2$ to ignite the fuel spray $f_2$.

[Second Embodiment]

A combustion chamber for an internal-combustion engine, in a second embodiment, according to the present invention will now be described with reference to the relevant drawings.

Figure 11:
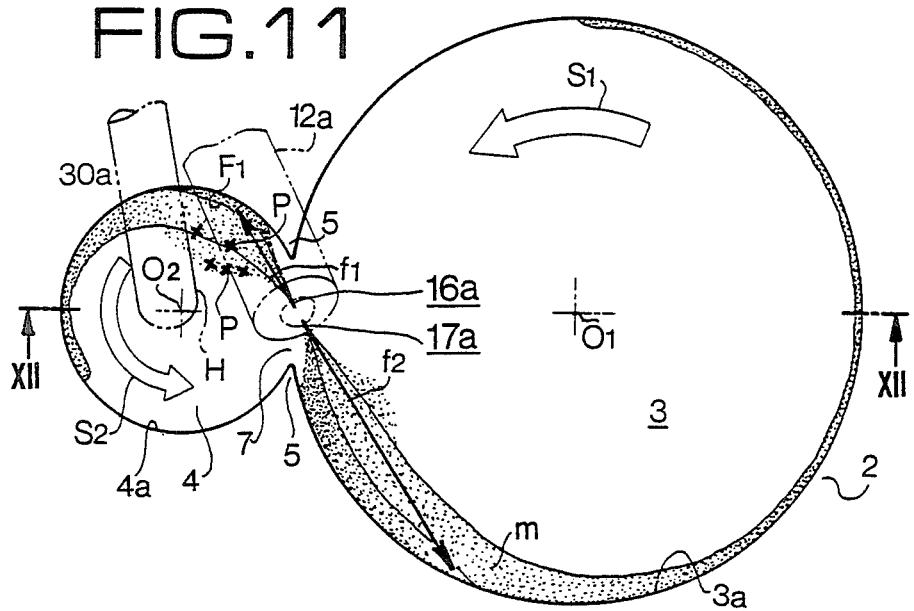
FIG. 11 is a plan view of a combustion chamber, in a second embodiment, according to the present invention.
Figure 12:
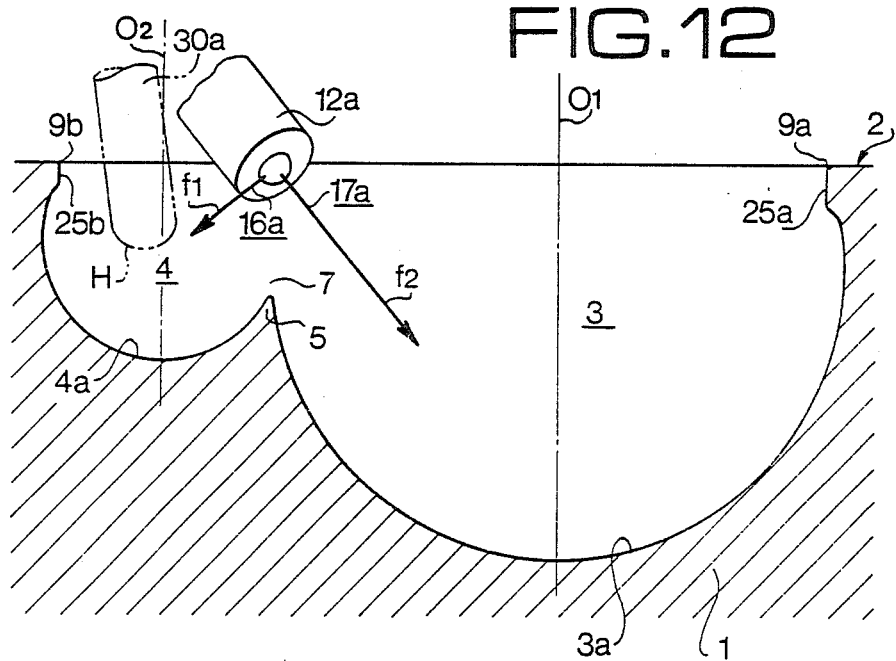
FIG. 12 is a sectional view taken on line XII—XII in FIG. 11 as viewed in the direction of an arrow.

In FIGS. 11 and 12, indicated at 1 is a piston slidably fitted in the cylinder, not shown, of an internal-combustion engine for reciprocation, at 2 is the crown of the piston 1, at 3 is a main combustion chamber, and at 4 is an auxiliary combustion chamber.

The main combustion chamber 3 is formed in the central portion of the crown and the auxiliary combustion chamber 4 is formed also in the crown 2 contiguously to the main combustion chamber 3. In the second embodiment, the main combustion chamber 3 and the auxiliary combustion chamber 4 each has the shape of an arc of a circle and a circle in vertical section in a vertical plane containing the center axis of the piston 1 and in horizontal section in a horizontal plane parallel to the top surface of the crown 2 of the piston 1, respectively. The depth and volume of the main combustion chamber 3 are greater than those of the auxiliary combustion chamber 4, respectively. The main combustion chamber 3 and the auxiliary combustion chamber 4 communicate with each other by means of a connecting passage 7 defined by a bank 5, namely, the common circumferential wall of the main combustion chamber 3 and the auxiliary combustion chamber 4.

In the second embodiment, the connecting passage 7 is formed by locating the center axis $0_2$ of the auxiliary combustion chamber 4 relative to the center axis $0_1$ of the main combustion chamber 3 so that the respective circumferential walls of the main combustion chamber 3 and the auxiliary combustion chamber 4 overlap each other properly. That is, the overlap between the main combustion chamber 3 and the auxiliary combustion chamber 4, hence the size of the connecting passage 7 formed over the bank 5, varies according to the distance between the center axes $O_1$ and $O_2$.

Thus, the open main combustion chamber 3 and the open auxiliary combustion chamber 4 are formed contiguously in the crown 2 of the piston 1. The respective brims 9a and 9b of the main combustion chamber 3 and the auxiliary combustion chamber 4 are suitably extended radially inward to form lips 25a and 25b, respectively, for producing individual swirls $S_1$ and $S_2$ and squishes in the main combustion chamber 3 and the auxiliary combustion chamber 4, respectively.

This embodiment employs the fuel injection nozzle 12a of FIG. 4 or the fuel injection nozzle 12b of FIG. 5.

The first fuel injection nozzle 12a comprises, as principal elements, a cylindrical nozzle body 13a fixed to the cylinder head, not shown, and having a valve seat 14a formed inside the tip thereof, a main nozzle hole 17a formed in the tip thereof, an auxiliary nozzle hole 16a opening in the valve seat 14a, and a fuel chamber, not shown, formed by radially expanding upper internal space 26 thereof; and a needle valve element 15a having a throttle surface 18a to be seated on the valve seat 14a to close the nozzle holes 16a and 17a, and disposed vertically movably within the nozzle body 13a. The main nozzle hole 17a is opened when the lift of the needle valve element 15a exceeds a predetermined lift for opening only the auxiliary nozzle hole 16a. A fuel pressure according to the fuel supply pressure of a fuel injection pump, not shown, is applied to the upper throttle surface, not shown, of the needle valve element 15a in the fuel chamber to regulate the lift of the needle valve element 15a. The diameter $d_1$ of the auxiliary nozzle hole 16a is far smaller than the diameter $d_2$ of the main nozzle hole 17a. The main nozzle hole 17a is formed so as to spout the fuel in a highly penetrative and dispersive spray, while the auxiliary nozzle hole 16a is formed so as to spout the fuel surely in a predetermined direction in a moderately penetrative well atomized fuel spray to enhance the vaporization of the fuel.

The second fuel injection nozzle 12b is shown in FIG. 5. Basically, the second fuel injection nozzle 12b is the same in constitution as the first fuel injection nozzle 12a.

As illustrated in FIG. 5, the second fuel injection nozzle 12b comprises, as principal elements, a nozzle body 13b and a needle valve element 15b. A taper valve seat 14b is formed inside the extremity of the nozzle body 13b so as to receive the throttle surface 18b of the needle valve element 15b thereon. A fuel injection chamber 20 is formed adjacent to the valve seat 14b so as to communicate with a fuel chamber, not shown, when the needle valve element 15b is lifted up. An auxiliary nozzle hole 16b opens in the valve seat 14b, while a main nozzle hole 17b opens into the fuel injection chamber 20.

Thus, in the first fuel injection nozzle 12a and the second fuel injection nozzle 12b, only the auxiliary nozzle holes 16a and 16b are opened when the lift of the needle valve elements 15a and 15b is below a predetermined value, and both the auxiliary nozzle holes 16a and 16b and the main nozzle holes 17a and 17b are opened when the lift of the needle valve elements 15a and 15b exceeds the predetermined value. That is, the first and second fuel injection nozzles 12a and 12b are so-called Pintaux nozzles, in which the auxiliary nozzle hole is opened before the main nozzle hole.

The second embodiment will now be described as employing the first fuel injection nozzle 12a.

As illustrated in FIGS. 11 and 12, the fuel injection nozzle 12a is fixed to the cylinder head, not shown, so that the auxiliary nozzle hole 16a and the main nozzle hole 17a are directed toward the auxiliary combustion chamber 4 and the main combustion chamber 3, respectively, and so that the fuel is spouted in the swirling directions of the swirls $S_2$ and $S_1$ against the inner surfaces 4a and 3a of the auxiliary combustion chamber 4 and the main combustion chamber 3, respectively.

The second embodiment is provided with combustion accelerating means to improve the ignition and combustion of volatile fuel having a low cetane number.

For fuel oils having a comparatively large cetane number, a preheating plug 30a (glow plug) is employed as the combustion accelerating means as illustrated in FIGS. 11 and 12. The heating tip H of the preheating plug 30a is formed of a ceramic. The preheating plug 30a is fixed to the cylinder head, not shown, so that the heating tip H thereof is positioned substantially at the center of the auxiliary combustion chamber 4. Accordingly, the interior of the auxiliary combustion chamber 4 can be heated at a high temperature even when the atmospheric temperature is very low and when the temperature of the inner surface 4a of the auxiliary combustion chamber 4 is not high enough to vaporize the fuel. Accordingly, the atomized fuel spray $f_1$, the compressed air, the inner surface 4a of the auxiliary combustion chamber and the fuel film $F_1$, which were described with reference to the first embodiment, can be heated to produce a sufficient premixture in the auxiliary combustion chamber 4 for combustion.

For fuel oils having a very small cetane number which cannot be ignited even if the preheating plug 30a is provided, a spark plug 30b is employed as the combustion accelerating means.

Figure 13:
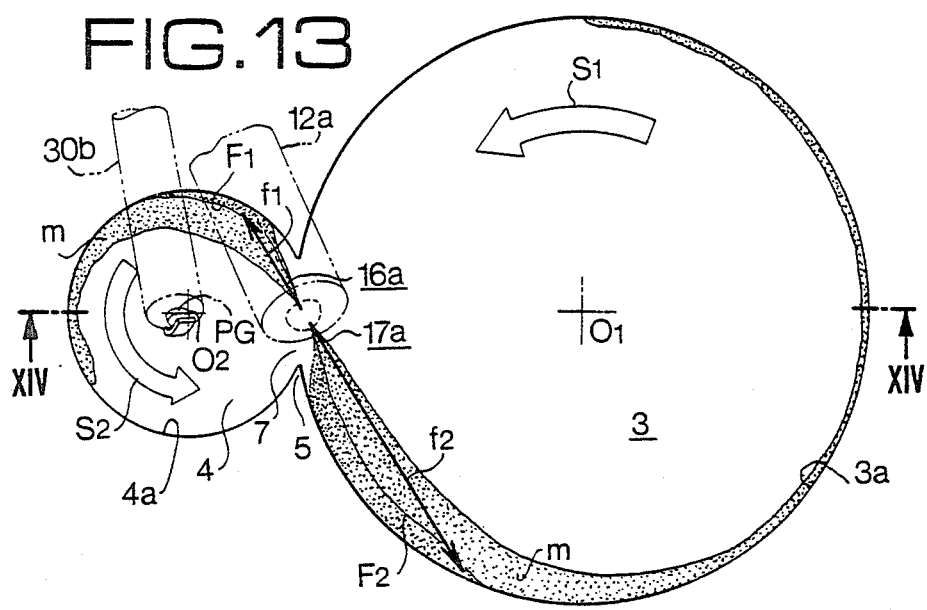
FIG. 13 is a plan view of the second embodiment as provided with a spark plug.
Figure 14:
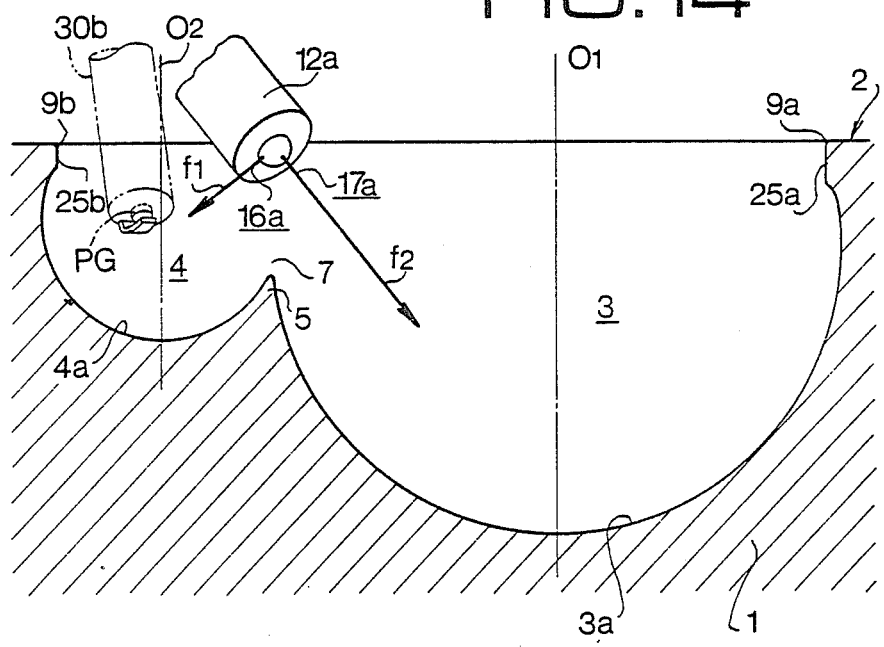
FIG. 14 is a sectional view taken on line XIV—XIV in FIG. 13 as viewed in the direction of an arrow.

As illustrated in FIGS. 13 and 14, the spark plug 30b is fixed to the cylinder head, not shown, so that the plug gap $P_G$ thereof is positioned substantially at the center of the auxiliary combustion chamber 4 and near the atomized fuel spray $f_1$ spouted from the auxiliary nozzle hole 16a.

At the start of the engine or during the low-load operation of the engine, a fuel oil having a low cetane number is spouted through the auxiliary nozzle hole 16a of the fuel injection nozzle 12a in an atomized fuel spray $f_1$ into the auxiliary combustion chamber 4. Upon the impingement of the atomized fuel spray $f_1$ on the inner surface 4a of the auxiliary combustion chamber 4, the fuel is further atomized and forms a fuel film $F_1$ which flows along the inner surface 4a. A portion of the fuel having a small cetane number spouted in small droplets is vaporized in an instant by the swirl and produces an ignitable premixture m, while the rest of the fuel spouted forms the fuel film $F_1$, which is vaporized gradually on the inner surface.

The premixture m is ignited by the spark plug 30b for combustion. Then, flame propagates from the point of ignition within the auxiliary combustion chamber 4 toward the inner surface 4a of the auxiliary combustion chamber 4 to cause the gradual combustion of the fuel film $F_1$ flowing along the inner surface 4a. In starting the engine at a low temperature, it is possible to control the fuel being ignited by the spark plug 30b by regulating the air fuel ratio of the premixture.

Figure 15:
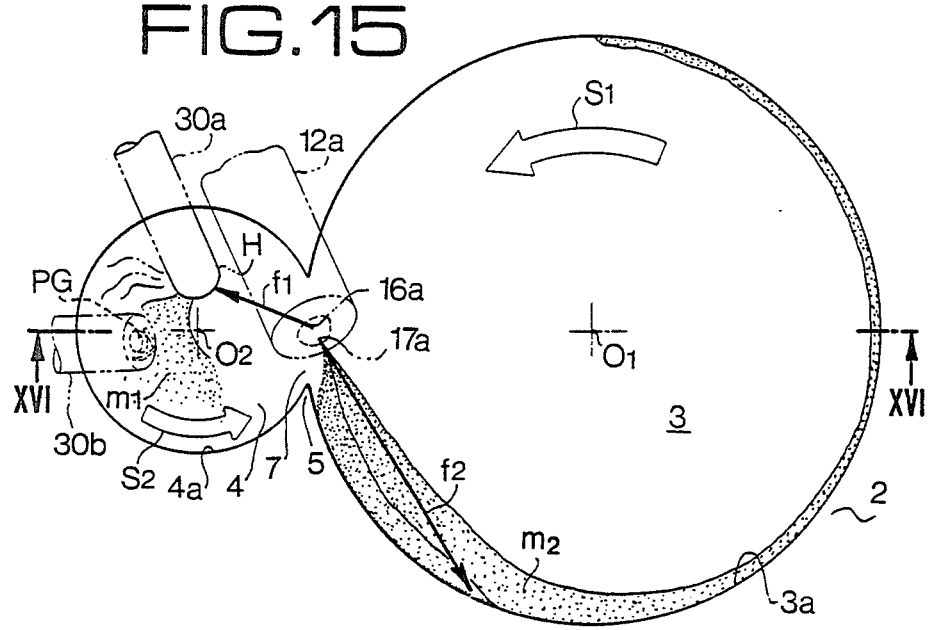
FIG. 15 is a plan view of the second embodiment as provided with a spark plug and a preheating plug.
Figure 16:
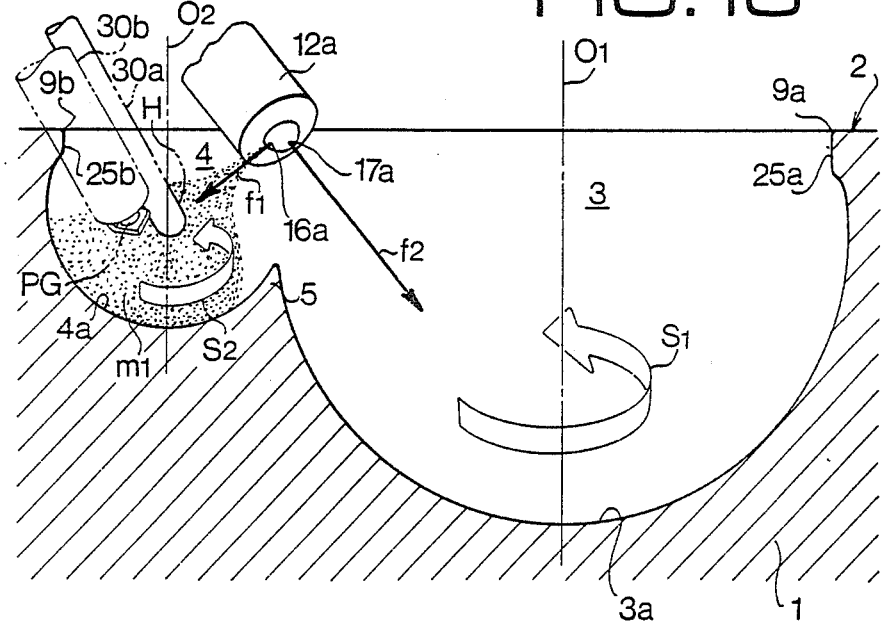
FIG. 16 is a sectional view taken on line XVI—XVI in FIG. 15 as viewed in the direction of an arrow.

FIGS. 15 and 16 illustrate the combustion chamber, in the second embodiment, employing a spark plug 30b and a preheating plug 30a as the combustion accelerating means.

The spark plug 30b and the preheating plug 30a are disposed so that the heating tip H and the plug gap $P_G$ are positioned within the auxiliary combustion chamber 4. The spark plug 30b is disposed near and after the preheating plug 30a with respect to the swirling direction of the swirl $S_2$. The fuel injection nozzle 12a is disposed with the auxiliary nozzle hole 16a directed exactly or approximately toward the preheating plug 30a and with the main nozzle hole 17a directed toward the inner surface 3a of the main combustion chamber 3 so as to spout the fuel along the swirling direction of the swirl $S_1$.

In starting the engine, the needle valve element 15a of the fuel injection nozzle 12a is lifted up. In starting the engine at a low temperature, since the fuel injection pump is driven at 50 to 150 rpm while the engine is driven by the starting motor and the fuel flow speed is very low despite excessive fuel feed (a fuel feed mode in which the fuel is fed at a rate higher than that in the full-load operation of the engine), the needle valve element 15a is maintained at a small lift for opening only the auxiliary nozzle hole 16a, so that the atomized fuel spray $f_1$ is fed at a high feed rate into the auxiliary combustion chamber 4. Since the atomized fuel spray $f_1$ is sprayed exactly or approximately toward the preheating plug 30a, the atomized fuel is vaporized rapidly by the compressed air further heated by the preheating plug 30a and the vaporized fuel mixes with the air to produce a highly ignitable premixture $m_1$. The premixture $m_1$ flows along with the swirl $S_2$ and is ignited reliably by the ignition plug 30b which is actuated when the premixture $m_1$ is distributed around the ignition plug 30b. When the fuel injection nozzle 12a is disposed so as to spray the atomized fuel spray $f_1$ against the inner surface 4a of the auxiliary combustion chamber before the preheating plug 30a with respect to the swirling direction, the atomized fuel impinges on the inner surface 4a and scatters, so that the atomized fuel is further atomized to accelerate the vaporization of the fuel and the production of the premixture. Consequently, a rich premixture is produced in the auxiliary combustion chamber 4. After the engine has been started at a low temperature, the inner surface 4a of the auxiliary combustion chamber 4 is heated by the heat produced by combustion to a temperature high enough to vaporize the fuel, and thereby the atomized fuel spray $f_1$ sprayed through the auxiliary nozzle hole 16a is stably ignited and combusted during the low-load operation of the engine. Since the auxiliary combustion chamber 4 is separated from the main combustion chamber 3 by the bank 5 and the most part of the combustion gas is held in the auxiliary combustion chamber 4 by the swirl $S_2$ swirling within the auxiliary combustion chamber 4, the vaporized fuel is unable to flow into the main combustion chamber 3, and hence the air fuel ratio of the premixture in the auxiliary combustion chamber 4 can be maintained at a predetermined value. Accordingly, a volatile fuel oil having a low cetane number, such as alcohol, can be combusted comparatively rapidly within the auxiliary combustion chamber 4. Consequently, the combustion temperature is elevated and the production of white smoke and unburned substances (HCs) is suppressed. During the low-load operation of the engine, the average combustion temperature within the auxiliary combustion chamber 4 is elevated, and thereby the production of white smoke and unburned substances (HCs) is suppressed.

During the high-load operation of the engine, the fuel spray $f_2$ is sprayed through the main nozzle hole 17a toward the inner surface 3a of the main combustion chamber 3 along the swirling direction of the swirl $S_1$ as illustrated in FIGS. 15 and 16. Therefore, a fuel film $F_2$ which flows along the inner surface 3a of the main combustion chamber 3 in the swirling direction of the swirl $S_2$ is formed. The fuel film $F_2$ is vaporized by the heat produced by the combustion in the auxiliary combustion chamber 4, the heat of the compressed air and the heat of the wall of the combustion chamber, and thereby a premixture $m_2$ is produced. The premixture $m_2$ is ignited by the flame propagating from the auxiliary combustion chamber 4 to the main combustion chamber 3. Since the fuel droplets spouted through the main nozzle hole 17a is greater than those spouted through the auxiliary nozzle hole 16a, and the fuel spray spouted through the main nozzle hole 17a is penetrative, the premixture $m_2$, namely, a mixture of the vaporized fuel and the compressed air, is not produced in excess in the main combustion chamber 3. Accordingly, when ignited, rapid combustion of the premixture $m_2$ does not occur in the main combustion chamber 3. Accordingly, the fuel film $F_2$ is vaporized rapidly by the heat produced by the combustion of the premixture $m_2$ and the vaporized fuel is ignited for slow combustion. Thus, the sharp rise in the internal pressure of the main combustion chamber 3 is suppressed and combustion noise is reduced. The proportion of the amount of fuel spouted through the main nozzle hole 17a to the total amount of fuel spouted from the fuel injection nozzle increases as the engine load increases and becomes 90% or above at the most, and hence the fuel injected into the main combustion chamber 3 is reliably vaporized and the vaporized fuel is reliably ignited by the flame propagating from the auxiliary combustion chamber 4 to the main combustion chamber 3.

[Third Embodiment]

A combustion chamber for an internal-combustion engine, in a third embodiment, according to the present invention will now be described with reference to the relevant drawings.

Figure 17:
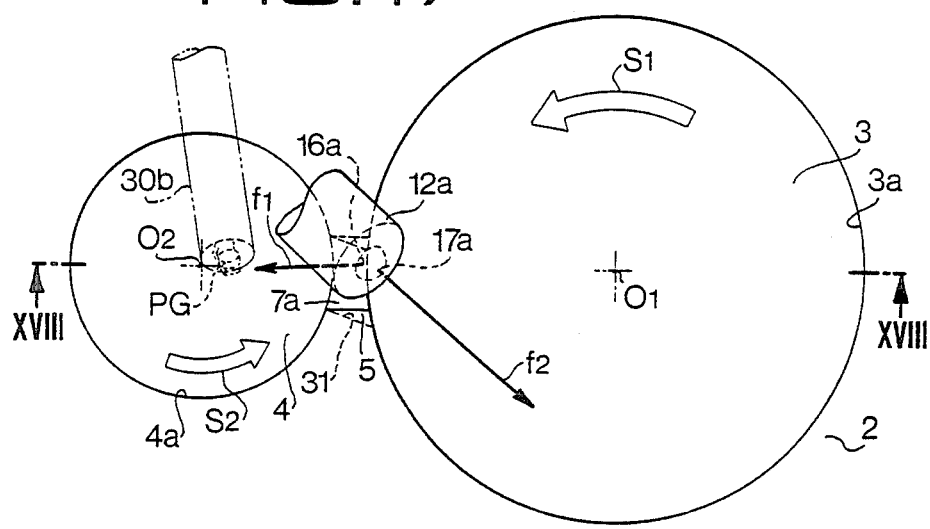
FIG. 17 is a plan view of a combustion chamber, in a third embodiment, according to the present invention.
Figure 18:
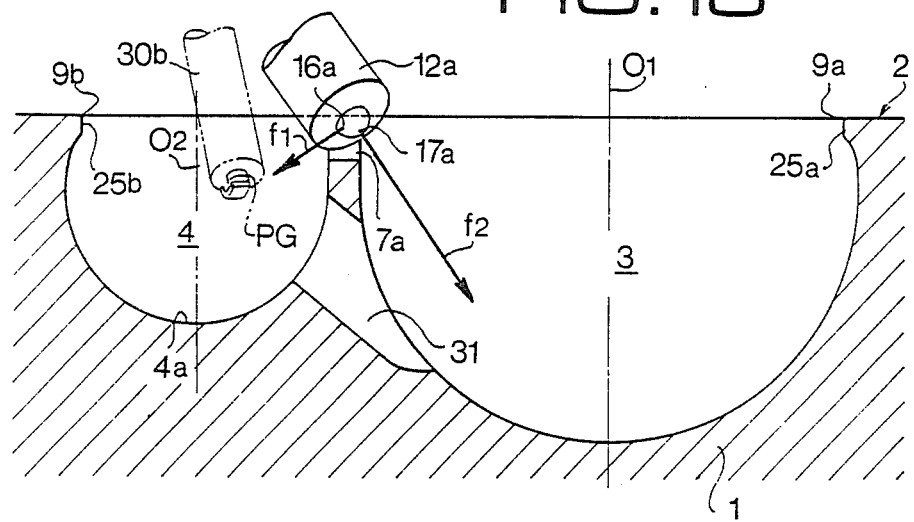
FIG. 18 is a sectional view taken on line XVIII—XVIII in FIG. 17 as viewed in the direction of an arrow.

In FIGS. 17 and 18, indicated at 1 is a piston slidably fitted in the cylinder, not shown, of an internal-combustion engine for reciprocation, at 2 is the crown of the piston 1, at 3 is a main combustion chamber, and at 4 is an auxiliary combustion chamber.

The main combustion chamber 3 is formed in the central portion of the crown 2 and the auxiliary combustion chamber is formed also in the crown 2 contiguously to the main combustion chamber 3. In the third embodiment, the main combustion chamber 3 and the auxiliary combustion chamber 4 each has the shape of an arc of a circle and a circle in vertical section in a vertical plane containing the center axis of the piston 1 and in horizontal section in a horizontal zontal plane parallel to the top surface of the crown 2 of the piston 1, respectively. The depth and volume of the main combustion chamber 3 is greater than those of the auxiliary combustion chamber 4, respectively. The main combustion chamber 3 and the auxiliary combustion chamber 4 communicate with each other by means of a connecting passage defined by a bank 5, namely, the common circumferential wall of the main combustion chamber 3 and the auxiliary combustion chamber 4.

In the third embodiment, the connecting passage is a groove 7a formed in the upper portion of the bank 5 so as to extend substantially along a line passing the respective centers of the main combustion chamber 3 and the auxiliary combustion chamber 4.

Thus, the open main combustion chamber 3 and the open auxiliary combustion chamber 4 are formed contiguously in the crown 2 of the piston 1 so as to communicate with each other. The respective brims 9a and 9b of the main combustion chamber 3 and the auxiliary combustion chamber 4 are extended radially inward to form lips 25a and 25b, respectively, for producing individual swirls $S_1$ and $S_2$ and squishes in the main combustion chamber 3 and the auxiliary combustion chamber 4, respectively.

This embodiment employs the fuel injection nozzle 12a of FIG. 4 or the fuel injection nozzle 12b of FIG. 5.

The first fuel injection nozzle 12a comprises, as principal elements, a cylindrical nozzle body 13a fixed to the cylinder head, not shown, and having a valve seat 14a formed inside the tip thereof, a main nozzle hole 17a formed in the tip thereof, an auxiliary nozzle hole 16a opening in the valve seat 14a, and a fuel chamber, not shown, formed by radially expanding upper internal space 26 thereof; and a needle valve element 15a having a throttle surface 18a to be seated on the valve seat 14a to close the nozzle holes 16a and 17a, and disposed vertically movably within the nozzle body 13a. The main nozzle hole 17a is opened when the lift of the needle valve element 15a exceeds a predetermined lift for opening only the auxiliary nozzle hole 16a. A fuel pressure according to the fuel supply pressure of a fuel injection pump, not shown, is applied to the upper throttle surface, not shown, of the needle valve element 15a in the fuel chamber to regulate the lift of the needle valve element 15a. The diameter $d_1$ of the auxiliary nozzle hole 16a is far smaller than the diameter $d_2$ of the main nozzle hole 17a. The main nozzle hole 17a is formed so as to spout the fuel in a highly penetrative and dispersive spray, while the auxiliary nozzle hole 16a is formed so as to spout the fuel reliably in a predetermined direction in a moderately penetrative well atomized fuel spray to enhance the vaporization of the fuel.

The second fuel injection nozzle 12b is shown in FIG. 5. Basically, the second fuel injection nozzle 12b is the same in construction as the first fuel injection nozzle 12a.

As illustrated in FIG. 5, the second fuel injection nozzle 12b comprises, as principal elements, a nozzle body 13b and a needle valve element 15b. A taper valve seat 14b is formed inside the extremity of the nozzle body 13b so as to receive the throttle surface 18b of the needle valve element 15b thereon. A fuel injection chamber 20 is formed adjacent to the valve seat 14b so as to communicate with a fuel chamber, not shown, when the needle valve element 15b is lifted up. An auxiliary nozzle hole 16b opens in the valve seat 14b, while a main nozzle hole 17b opens into the fuel injection chamber 20.

Thus, in the first fuel injection nozzle 12a and the second fuel injection nozzle 12b, only the auxiliary nozzle holes 16a and 16b are opened when the lift of the needle valve element 15a and 15b is below a predetermined value, and both the auxiliary nozzle holes 16a and 16b and the main nozzle holes 17a and 17b are opened when the lift of the needle valve elements 15a and 15b exceeds the predetermined value. That is, the first and second fuel injection nozzles 12a and 12b are so-called Pintaux nozzles, in which the auxiliary nozzle hole is opened before the main nozzle hole.

The third embodiment will be described as employing the first fuel injection nozzle 12a.

As illustrated in FIGS. 17 and 18, the fuel injection nozzle 12a is fixed to the cylinder head, not shown, so that the auxiliary nozzle hole 16a and the main nozzle hole 17a are directed toward the auxiliary combustion chamber 4 and the main combustion chamber 3, respectively. A spark plug 30b providing a combustion accelerating means is fixed to the cylinder head, not shown, so that the plug gap $P_G$ thereof is positioned substantially at the center of the auxiliary combustion chamber 4.

A flame guide channel 31 is formed through the bank 5 between the lower portion of the auxiliary combustion chamber 4 and the lower portion of the main combustion chamber 3 so as to guide flames from the auxiliary combustion chamber 4 into the main combustion chamber 3.

Figure 19:
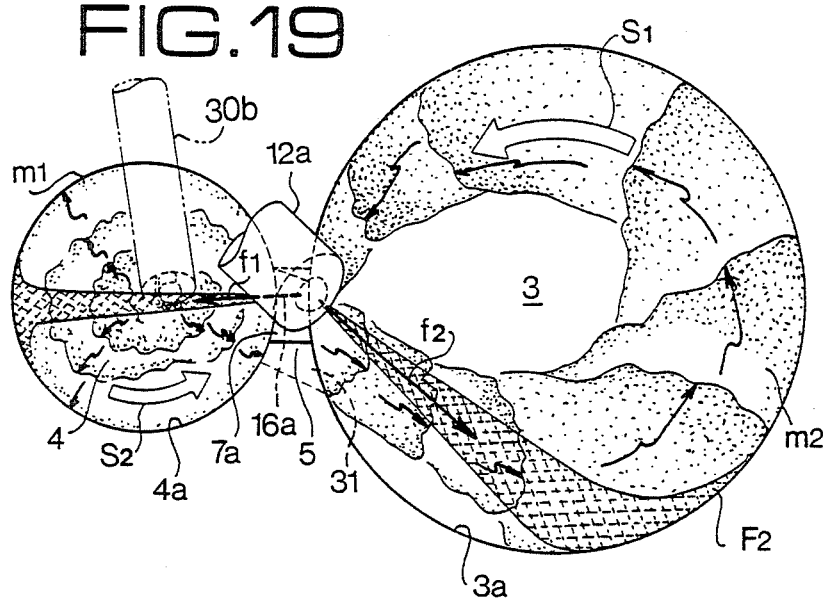
FIGS. 19 to 21 are schematic illustrations showing combustion process in the third embodiment.
Figure 20:
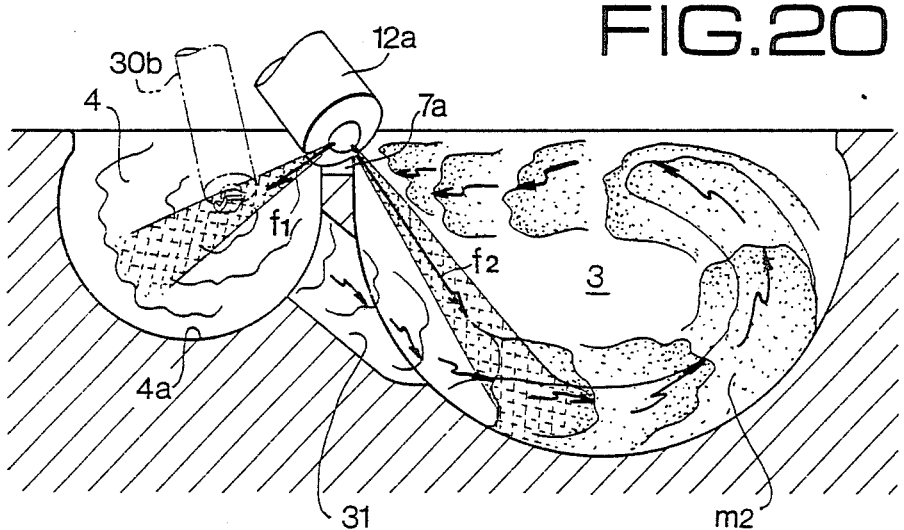

As illustrated in FIGS. 19 and 20, Atomized fuel spray $f_1$ injected into the auxiliary combustion chamber 4 is vaporized in an instant upon contact with hot compressed air and mixes with the compressed air to produce a premixture $m_1$ of an appropriate air fuel ratio, which swirls together with the swirl $S_2$ within the auxiliary combustion chamber 4. The premixture $m_1$ is ignited by the spaek plug 30b, and then rapid combustion of the premixture $m_1$ occurs in the auxiliary combustion chamber 4. Then, flames flow through the flame guide channel 31 into the main combustion chamber 3.

On the other hand, during the middle- and high-load operation of the engine where the needle valve element 15a is lifted up above a predetermined lift, fuel spray $f_2$ is spouted into the main combustion chamber 3. A portion of the fuel spray $f_2$ forms a fuel film $F_2$ that flows along the inner surface 3a of the main combustion chamber 3 in the swirling direction of the swirl $S_2$, while the rest of the fuel spray $f_2$ impinges against the inner surface 3a of the main combustion chamber 3 and scatters to be further atomized and vaporized by the heat of the compressed air prevailing in the main combustion chamber 3. At the same time, the fuel film $F_2$ also is vaporized by the heat of the wall of the main combustion chamber 3. Thus, a premixture $m_2$ of an appropriate air fuel ratio is produced in the main combustion chamber 3.

The premixture $m_2$ produced in the main combustion chamber 3 is ignited quickly by the flames that flow from the auxiliary combustion chamber 4 through the flame guide channel 31 into the main combustion chamber 3. Then, flames propagate from the vicinity of the flame guide channel 31 toward the lower portion and then along the inner surface 3a toward the upper portion of the main combustion chamber 3 to complete combustion as shown in FIG. 20.

Figure 21:
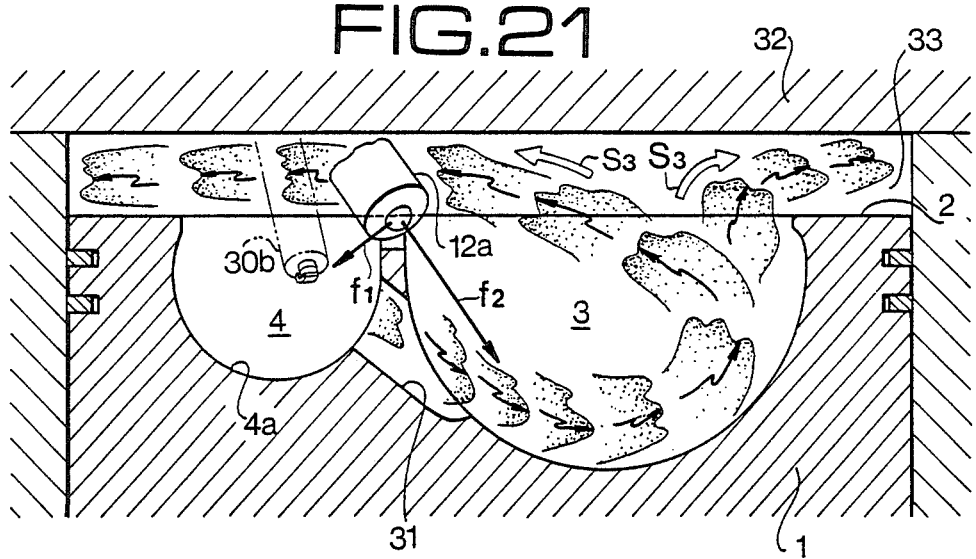

When flames propagate from the auxiliary combustion chamber 4 to the main combustion chamber 3, the piston 1 is practically at the top dead point as shown in FIG. 21. Accordingly, the premixture which has not yet been ignited in the main combustion chamber 3 flows into a squish area 33 formed between the cylinder head 32 and the crown 2 of the piston 1 as the piston moves downward. That is, reverse squish $S_3$ is produced. Since flames propagate from the lower portion to the upper portion of the main combustion chamber 3, the unburned premixture is burned completely. During the low-load operation of the engine, some part of the fuel vaporized in the auxiliary combustion chamber 4 flows through the flame guide channel 31 into the main combustion chamber. This vaporized fuel is recirculated for combustion by the EGR (exhaust gas recirculating system) or is burned by means of an oxidizing catalyst.

Accordingly, volatile fuel oils having a low cetane number, including light oil, can be combusted rapidly and completely in the combustion chamber of the present invention in the entire operating range of the engine including engine warming-up period, and thereby the output of the engine is enhanced and fuel consumption rate is improved.

Figure 22:
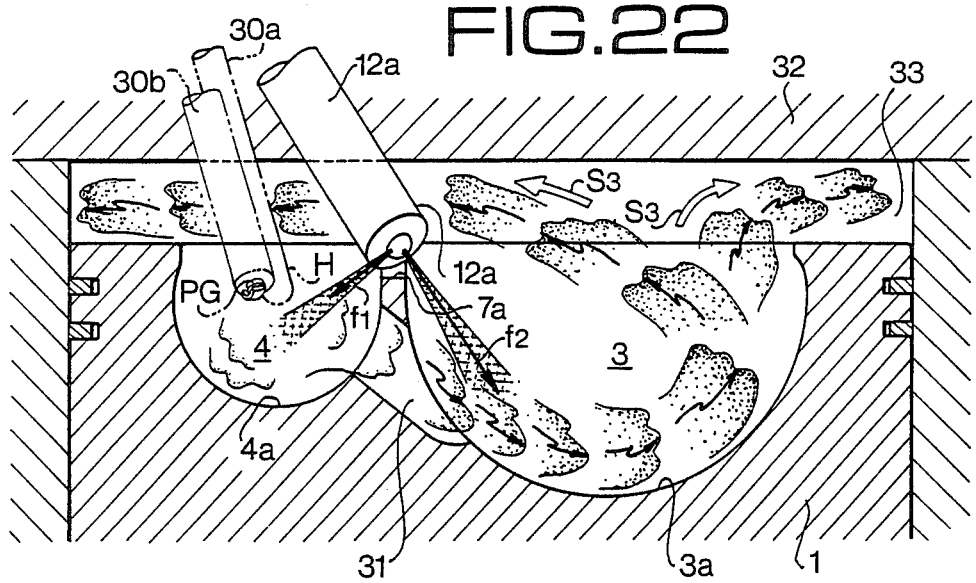
FIG. 22 is a longitudinal sectional view of a modification of the third embodiment, provided with combustion accelerating means and a flame guide passage.
Figure 23:
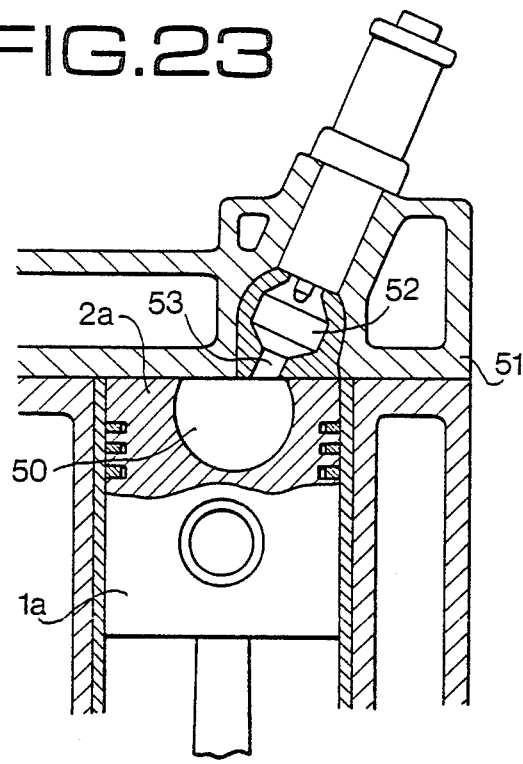
FIGS. 23 to 26 are longitudinal sectional views of conventional combustion chambers, respectively, for internal-combustion engines.
Figure 24:
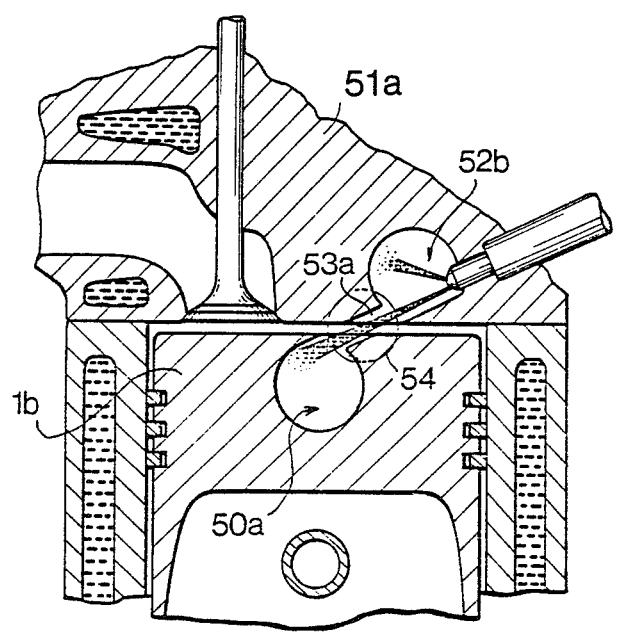
Figure 25:
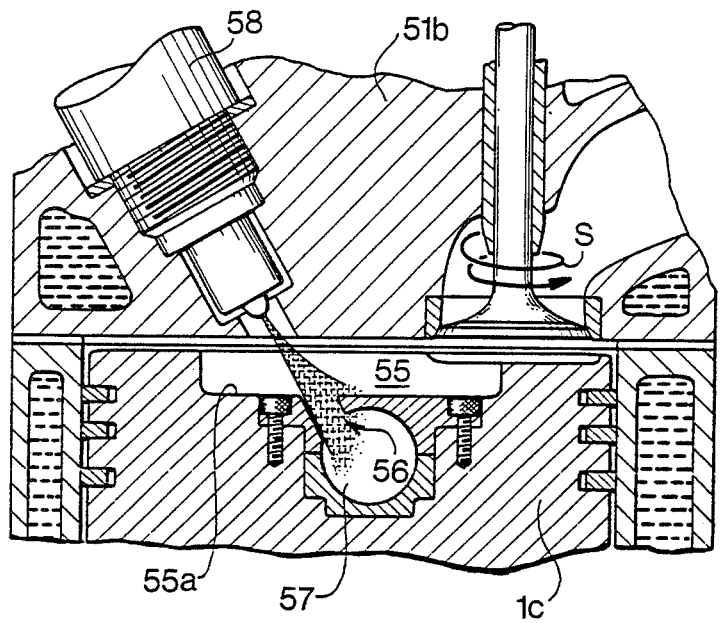
Figure 26:
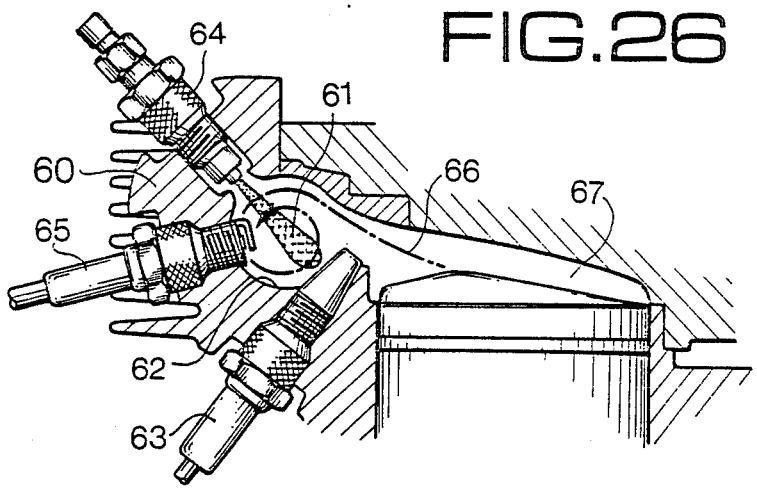

FIG. 22 illustrates a modification of the third embodiment, in which a preheating plug 30a (glow plug) and a spark plug 30b are provided in the combustion chamber of an internal-combustion engine.

In this modification, the interior of the auxiliary combustion chamber 4 is heated at a high temperature to vaporize the fuel in starting the engine under a very cold atmosphere, then the premixture $m_1$ produced by vaporizing the fuel is ignited by the spark plug 30b, and then flames, hence thermal energy, are introduced through the flame guide channel 31 into the main combustion chamber 3.

Thus, the stability of combustion, even if the fuel is a volatile fuel oil having a low cetane number, is further improved, and hence the reliability of the internalcombustion engine is enhanced remarkably.

Although the invention has been described in its preferred form with a certain degree of particularity, it is to be understood that many changes and variations are possible in the invention without departing from the scope and spirit thereof.

What is claimed is:

1. A combustion chamber for an internal-combustion engine, comprising:
    a main combustion chamber defined by a first recess in the top surface of the crown of a piston;
    an auxiliary combustion chamber defined by a second recess in the top surface of the crown of said piston beside said main combustion chamber, the volume of said auxiliary combustion chamber being smaller than the volume of said main combustion chamber;
    a connecting part between said main combustion chamber and said auxiliary combustion chamber;
    fuel injecting means disposed in said connecting part between said main combustion chamber and said auxiliary combustion chamber, and having an auxiliary nozzle hole for injecting fuel into said auxiliary combustion chamber during all running conditions of the engine, and a main nozzle hole for injecting fuel into said main combustion chamber only when the engine is operated under running heavier than a light engine load condition; and
    ignition assisting means extending into said auxiliary combustion chamber for assisting in igniting the fuel.

2. A combustion chamber for an internal-combustion engine as recited in claim 1, wherein said main combustion chamber and said auxiliary combustion chamber are each hemispherical in shape, the depth and volume of said auxiliary combustion chamber being less than the depth and volume of said main combustion chamber.

3. A combustion chamber for an internal-combustion engine as recited in claim 1, wherein each of said main and auxiliary combustion chambers is an open chamber and has a lip extending radially inward from the brim thereof, and arranged to facilitate swirls within said main and auxiliary combustion chambers which assist in mixing the fuel with air.

4. A combustion chamber for an internal-combustion engine as recited in claim 2, wherein each of said main and auxiliary combustion chambers is an open chamber and has a lip extending radially inward from the brim thereof, and arranged to facilitate swirls within said main and auxiliary combustion chambers which assist in mixing the fuel with air.

5. A combustion chamber for an internal-combustion engine as recited in claim 1, wherein said connecting part is defined by a concavity in the top surface of the crown of said piston between said main combustion chamber and said auxiliary combustion chamber, and has a predetermined depth limited by a bank so that the auxiliary combustion chamber has a predetermined depth.

6. A combustion chamber for an internal-combustion engine as recited in claim 2, wherein said fuel injecting means has a needle valve element axially slidably fitted in a nozzle body so as to open said auxiliary nozzle hole when the lift thereof is below a predetermined lift and to open said main nozzle hole when the lift thereof is above the predetermined lift.

7. A combustion chamber for an internal-combustion engine as recited in claim 1, wherein said main nozzle hole and said auxiliary nozzle hole of said fuel injecting means are directed so as to spout fuel against the respective inner surfaces of said main combustion chamber and said auxiliary combustion chamber in the respective directions of swirls formed in said main combustion chamber and said auxiliary combustion chamber, respectively.

8. A combustion chamber for an internal-combustion engine as recited in claim 6, wherein said main nozzle hole and said auxiliary nozzle hole of said fuel injecting means are directed so as to spout fuel against the respective inner surfaces of said main combustion chamber and said auxiliary combustion chamber in the respective directions of swirls formed in said main combustion chamber and said auxilliary combustion chamber, respectively.

9. A combustion chamber for an internal-combustion engine as recited in claim 1, wherein the diameter of said auxiliary nozzle hole of said fuel injecting means is very small as compared with the diameter of said main nozzle hole of said fuel injecting means.

10. A combustion chamber for an internal-combustion engine as recited in claim 6, wherein the diameter of said auxiliary nozzle hole of said fuel injecting means is very small as compared with the diameter of said main nozzle hole of said fuel injecting means.

11. A combustion chamber for an internal-combustion engine as recited in claim 7, wherein the diameter of said auxiliary nozzle hole of said fuel injecting means is very small as compared with the diameter of said main nozzle hole of said fuel injecting means.

12. A combustion chamber for an internal-combustion engine as recited in claim 1, wherein said ignition assisting means comprises a spark plug.

13. A combustion chamber for an internal-combustion engine as recited in claim 1, wherein said ignition assisting means comprises a preheating plug.

14. A combustion chamber for an internal-combustion engine as recited in claim 1, wherein said ignition assisting means comprises a preheating plug and a spark plug.

15. A combustion chamber for an internal-combustion engine as recited in claim 14, wherein said preheating plug is disposed before said spark plug with respect to the direction of flow of the fuel spouted through said auxiliary nozzle hole.

16. A combustion chamber for an internal-combustion engine as recited in claim 12, wherein said spark plug is disposed after said auxiliary nozzle hole with respect to the direction of flow of the fuel spouted through said auxiliary nozzle hole.

17. A combustion chamber for an internal-combustion engine as recited in claim 14, wherein said spark plug is disposed after said auxiliary nozzle hole with respect to the direction of flow of the fuel spouted through said auxiliary nozzle hole.

18. A combustion chamber for an internal-combustion engine as recited in claim 15, wherein said spark plug is disposed after said auxiliary nozzle hole with respect to the direction of flow of the fuel spouted through said auxiliary nozzle hole.

19. A combustion chamber for an internal-combustion engine, comprising:
a main combustion chamber defined by a first recess in surface of the crown of a piston;
an auxiliary combustion chamber defined by a second recess in the top surface of the crown of said piston beside said main combustion chamber, and having a volume smaller than the volume of said main combustion chamber;
a connecting part between said main combustion chamber and said auxiliary combustion chamber;
fuel injecting means disposed in said connecting part between said main combustion chamber and said auxiliary combustion chamber, and having an auxiliary nozzle hole for injecting fuel into said auxiliary combustion chamber during all running conditions of the engine, and having a main nozzle hole for injecting fuel into said main combustion chamber only when the engine is operated under running conditions heavier than a light engine load condition;
ignition assisting means extending into the auxiliary combustion chamber for assisting in igniting the fuel; and
a flame guide channel below said connecting part and interconnecting said main combustion chamber with said auxiliary combustion chamber, said flame guide channel being arranged to introduce essentially only the flame in said auxiliary combustion chamber to the bottom part of said main combustion chamber so that the introduced flame propagates upward along the inner wall of said main combustion chamber.

20. A combustion chamber for an internal-combustion engine as recited in claim 19, wherein said main combustion chamber and said auxiliary combustion chamber are each essentially hemispherical in shape, and the depth and volume of said auxiliary combustion chamber are respectively smaller than the depth and volume of said main combustion chamber.

21. A combustion chamber for an internal-combustion engine as recited in claim 19, wherein each of said main and auxiliary combustion chamber is an open chamber and has a lip extending radially inward from the brim thereof, said lip being arranged to facilitate swirls respectively in said main and auxiliary chambers to assist in mixing the fuel with air.

22. A combustion chamber for an internal-combustion engine as recited in claim 20, wherein each of said main and auxiliary combustion chamber is an open chamber and has a lip extending radially inward from the brim thereof, said lip being arranged to facilitate swirls respectively in said main and auxiliary combustion chambers to assist in mixing the fuel with air.

23. A combustion chamber for an internal-combustion engine as recited in claim 21, wherein said main combustion chamber and auxiliary combustion chamber are each essentially hemispherical in shape, the depth and volume of said auxiliary combustion chamber being respectively smaller than the depth and volume of said main combustion chamber.

24. A combustion chamber for an internal-combustion engine as recited in claim 19, wherein said connecting part is defined by a concavity in the top surface of the crown of the piston between said main combustion chamber and said auxiliary combustion chamber, said connecting part having a predetermined depth limited by a bank so that said auxiliary combustion chamber has a predetermined depth.

25. A combustion chamber for an internal-combustion engine as recited in claim 19, wherein said flame guide channel is inclined downwardly from the side of said auxiliary combustion chamber to the side of said main combustion chamber.

26. A combustion chamber for an internal-combustion engine as recited in claim 19, wherein said fuel injecting means has a needle valve element axially slidably fitted in a nozzle body so as to open said auxiliary nozzle hole when the lift thereof is below a predetermine lift and to open said main nozzle hole when the lift thereof is above the predetermined lift.

27. A combustion chamber for an internal-combustion engine as recited in claim 19, wherein said main nozzle hole and said auxiliary nozzle hole of said fuel injecting means are directed so as to spout fuel against the respective inner surfaces of said main combustion chamber and said auxiliary combustion chamber in the respective directions of swirl formed in said main combustion chamber and said auxiliary combustion chamber.

28. A combustion chamber for an internal-combustion engine as recited in claim 19, wherein the diameter of said auxiliary nozzle hole of said fuel injecting means is very small compared with the diameter of said main hole of said fuel injecting means.

29. A combustion chamber for an internal-combustion engine as recited in claim 26, wherein the diameter of said auxiliary nozzle hole of said fuel injecting means is very small compared with the diameter of said main hole of said fuel injecting means 30. A combustion chamber for an internal-combustion engine as recited in claim 27, wherein the diameter of said auxiliary nozzle hole of said fuel injecting means is very small compared with the diameter of said main hole of said fuel injecting means.

31. A combustion chamber for an internal-combustion engine as recited in claim 19, wherein said ignition assisting means comprises a spark plug.

32. A combustion chamber for an internal-combustion engine as recited in claim 19, wherein said ignition assisting means comprises a preheating plug.

33. A combustion chamber for an internal-combustion engine as recited in claim 19, wherein said ignition assisting means comprises a preheating plug and a spark plug.

34. A combustion chamber for an internal-combustion engine as recited in claim 33, wherein said preheating plug is disposed before said spark plug with respect to the direction of flow of the fuel spouted through said auxiliary nozzle hole.

35. A combustion chamber for an internal-combustion engine as recited in claim 31, wherein said spark plug is disposed after said auxiliary nozzle hole with respect to the direction of flow of the fuel spouted through said auxiliary nozzle hole.

* * * * *